United States Patent
Krahn

(10) Patent No.: US 6,490,795 B1
(45) Date of Patent: Dec. 10, 2002

(54) POWER CHAIN SAW HAVING A CHAIN FLUID PUMP

(75) Inventor: Klemens Krahn, Norderstedt (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/600,967

(22) PCT Filed: Jan. 26, 1999

(86) PCT No.: PCT/EP99/00450
§ 371 (c)(1),
(2), (4) Date: Sep. 20, 2000

(87) PCT Pub. No.: WO99/39128
PCT Pub. Date: Aug. 5, 1999

(30) Foreign Application Priority Data

Jan. 28, 1998 (DE) .......................................... 198 03 131

(51) Int. Cl.[7] .............................................. B27B 17/12
(52) U.S. Cl. ..................................................... 30/123.4
(58) Field of Search ............................... 30/123.4, 383, 30/382; 417/278, 296

(56) References Cited

U.S. PATENT DOCUMENTS

| | | | |
|---|---|---|---|
| 2,412,289 A | * 12/1946 | Pugh et al. ............. | 416/278 X |
| 4,132,289 A | 1/1979 | Makela ..................... | 184/14 R |
| 4,636,147 A | 1/1987 | Schweitzer et al. ......... | 417/214 |
| 4,801,253 A | 1/1989 | Johnsson .................... | 417/427 |
| 5,184,403 A | 2/1993 | Schliemann ............... | 30/123.4 |
| 5,411,382 A | 5/1995 | Duensing .................... | 417/500 |
| 5,478,217 A | 12/1995 | Jones ......................... | 417/461 |

* cited by examiner

Primary Examiner—Douglas D. Watts
(74) Attorney, Agent, or Firm—McCormick, Paulding & Huber LLP

(57) ABSTRACT

A chain medium pump (20) for a motor chain saw (10) is made disconnectable in a simple manner, the chain medium pump (20) sucking the chain medium over a suction pipe (29) from a tank (22) and delivering it over a pressure pipe (27) to a sawing device (12) of the motor chain saw (10), by the fact that, for disconnecting the supply of the sawing device (12) with the chain medium, there exist controllable means (23–26) with which the pressure pipe (27) is interrupted, the chain medium pump (20) being running, and simultaneously the chain medium delivered by the chain medium pump (20) can be returned into the suction pipe (29).

11 Claims, 3 Drawing Sheets

POWER CHAIN SAW HAVING A CHAIN FLUID PUMP

TECHNICAL FIELD

This invention refers to the field of the motor-driven manual labour devices. It concerns a chain medium pump for a motor-driven chain saw which sucks the chain medium over a suction pipe from a tank and which delivers it over a pressure pipe to a sawing device of a motor-driven chain saw. Such chain medium pumps are known, for example, from previous applications of the applicant, particularly from U.S. Pat. No. 4,465,440 and EP-BI-0 560 201.

Furthermore, the invention relates to a motor-driven chain saw with a chain medium pump.

PRIOR ART

For motor-driven chain saws, it is usual, for the lubrification of the chain with a chain medium, especially oil, to provide a special chain medium pump which is driven by the motor of the chain saw and which continuously sucks, during the operation of the saw, a lubrifying chain medium from a store container (tank) and delivers it to the chain where it is brought into contact at an appropriate place with the circulating chain saw.

According to the prior art, most of the time a piston pump is used as a chain medium pump for which a piston working in a cylinder is set into rotation around the piston axle by the motor of the chain saw over a worm gear pair and this rotation is converted into a periodical lifting movement of the piston by appropriate guiding means (for example by a surface being obliquely to the piston axle which which the rotating piston which is prestressed by a spring runs on a guiding pin). Examples of such piston pumps are known from the documents mentioned at the beginning but, for example, also from U.S. Pat. No. 3,938,622, U.S. Pat. No. 5,236,314 or U.S. Pat. No. 4,801,253.

When the chain medium pump is fixedly connected with the motor over the worm gear pair (for example with the crankshaft of a high-speed two-cycle internal combustion engine), it also delivers chain medium to the saw chain—if other measures are not taken—when the saw chain is disconnected from the running motor and stands. However, such a delivery is not wished if the chain is standing. Basically, it would be possible to also disconnect the chain medium pump from the motor through appropriate mechanical devices, when the saw chain is uncoupled. However, such a coupling device is not only complicated and expensive to manufacture but would also require a considerable supplementary space on the chain saw which is constructed as compact as possible and subsequently could not be easily integrated into already existing motor chain saws.

DESCRIPTION OF THE INVENTION, AIM, SOLUTION, ADVANTAGES

Therefore, the aim of the invention is to create a chain medium pump with which a disconnecting function of the pump can be realized in an easy and space-saving way, the chain being standing, and which only requires slight modifications on existing pump models.

This aim is achieved for a chain medium pump of the type mentioned in the introduction by the fact that, for disconnecting the supply of the sawing device with the chain medium controllable means exist with which the pressure pipe is interrupted, the chain medium pump being running, and simultaneously the chain medium delivered by the chain medium pump can be returned into the suction pipe. Due to the interruption of the pressure pipe and the simultaneous returning of the delivered chain medium to the suction side, the chain medium pump can run further without any impediment, the chain saw being standing, without the chain medium being delivered up to the chain. The chain medium pump over the chain medium in a closed circuit without being exposed to additional loads.

A first preferred embodiment of the chain medium pump according to the invention is characterized in that the controllable means comprise a reverse valve placed in the pressure pipe and a bypass guided by the reverse valve to the suction pipe. Through the reverse valve, an easily operatable space-saving control function with one-valued ON/OFF character is realized. The bypass can easily be integrated into the pump by a few additional elements.

A particularly robust and compact structure of the arrangement is achieved if, according to a second preferred embodiment of the chain medium pump according to the invention, the chain medium pump is placed in a pump case and that the reverse valve and the bypass are integrated into the pump case. Preferably, the reverse valve is configured as a swivelling piston valve to simply and to assure functional safety.

A further preferred embodiment of the chain medium pump according to the invention is characterized in that the chain medium pump comprises a pump piston axially movable in a cylinder bore in the pump case, that, for constituting the reverse valve, a valve bore which is connected with the cylinder bore over a pressure channel is placed in the pump case on the delivery side, valve bore in which a substantially cylindrical valve body with a swivelling piston is placed and swivellably positioned and that the bypass is formed by two through bore holes which discharge within the pump case starting from the valve bore or from the suction pipe at the same level into the cylinder bore and which are connected with each other by a ring groove placed on the pump piston. This type of recirculation can be particularly easily integrated into existing pump concepts if - as described in the documents U.S. Pat. No. 4,465,440 and EP-BI-0 560 201 of the applicant - a pump piston with a ring groove and a through bore are already existing in the pump concepts, because of other reasons, between the pressure pipe and the ring groove.

The swivelling piston preferably has a recess in the form of an axially extending segment of a circle which connects, in a first position of the swivelling piston, the pressure channel with the axially outgoing pressure pipe ; furthermore, the swivelling piston has a connecting groove which connects, in a second position of the swivelling piston, the pressure channel and the first through bore the one with the other.

The motor chain saw according to the invention with a chain medium pump according to the invention is characterized in that the motor chain saw comprises a safety key with which, the motor being running, the sawing device can be activated and desactivated and that the safety key and the controllable means or the reverse valve are operationally connected with each other over actuating means, so that, when releasing the safety key, the pressure pipe is automatically interrupted and, when actuating the safety key, the interruption of the pressure pipe is automatically suppressed. Through the coupling of the disconnectable chain medium pump with the safety key, a triggering function is realized which guarantees a single-valued ON/OFF function and which works practically insensitive to errors and tolerances.

The disconnecting function is triggered by the release of the rear handle of the chain saw, whereby the saw chain still does not have to stand but is, depending on the operator's habits, still drifting. The effect of this "advanced" disconnection of the delivery of the chain medium is that excess chain medium in the rail connecting area of the chain rail is transported by the drifting chain into the rail. Thus, a draining of the chain medium out of the chain intake area and thus an additional dirt accumulation in the machine is advantageously reduced.

The particular advantage of this triggering consists in that the chain lubrication already begins by actuating the safety key. It is thus assured that the chain medium is already delivered a few seconds before the start running of the saw chain and that the chain is sufficiently lubricated before the operator begins to cut. Furthermore, the use of the safety key offers the advantage that the necessary actuation forces for the valve are practically not perceived by the operator, since they are negligible with respect to the retention force of the machine or to the applied manual force. For the actuation of the valve, a force of, for example, 2 to 5 N is necessary, depending on the lever transmission which is carried out.

According to a preferred embodiment of the motor chain saw according to the invention, the actuating means comprise a Bowden cable which is simple and cheap.

Further embodiments result from the depending claims.

SHORT DESCRIPTION OF THE DRAWINGS

The invention will be explained in detail below with reference to the embodiments in connection with the enclosed drawings.

BEST WAY FOR CARRYING OUT THE INVENTION

Figure 1:
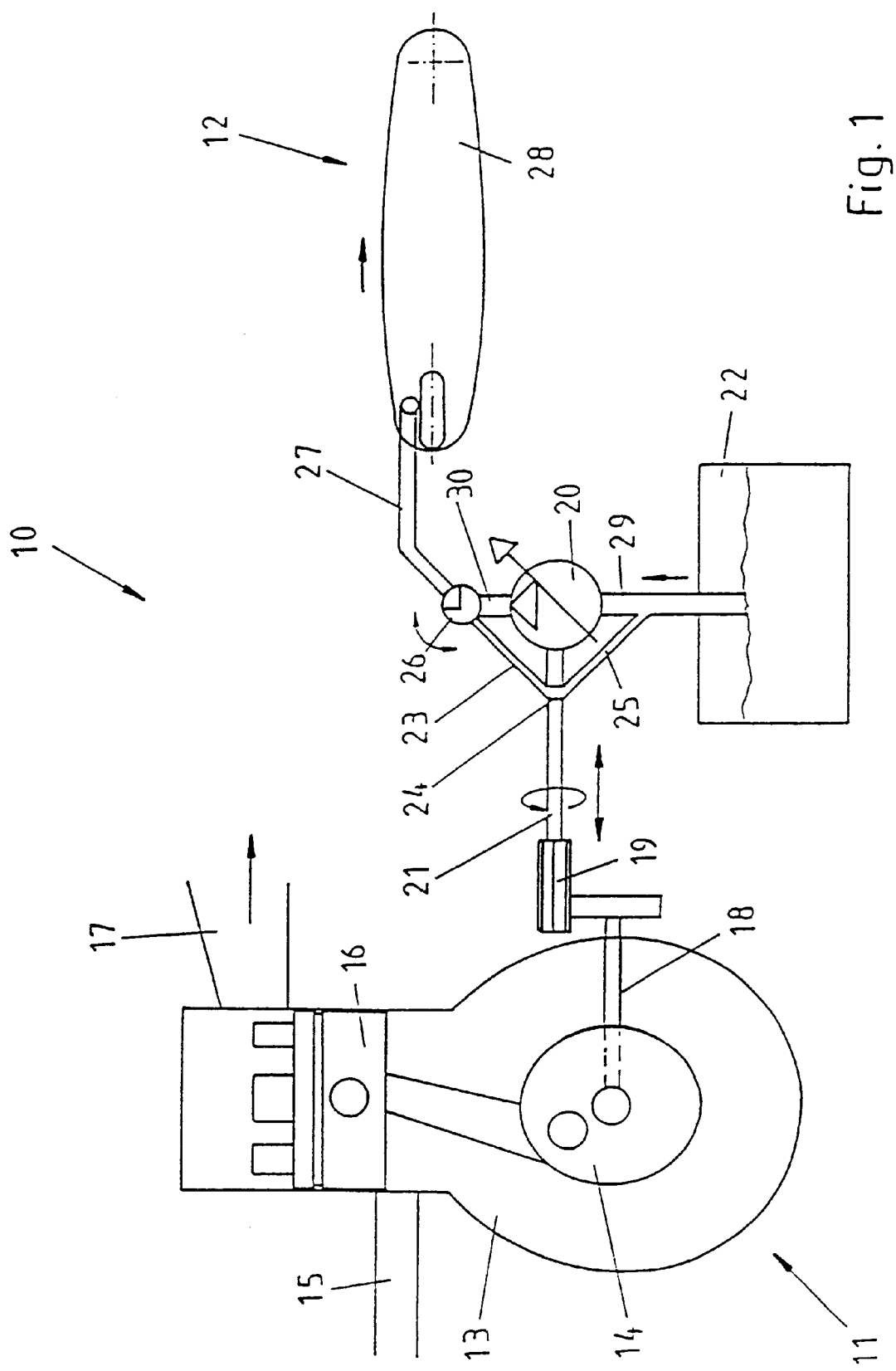
FIG. 1 shows, in a schematized representation, the essential functional blocks of a motor chain saw according to a preferred embodiment the invention.

In FIG. 1, the essential functional blocks of a motor chain saw 10 according to a preferred embodiment of the invention are represented in a schematized representation. The motor chain saw 10 comprises, as a driving gear, a motor 11 in form of a two-cycle internal combustion engine which is provided with a crankcase 13, a crankshaft 14, a piston 16, a suction pipe 15 and an outlet 17. A sawing device 12 with a saw chain circulating in a chain rail around a chain sword 28 (cf. also about this FIG. 1 of EP-BI-0 560 201) is driven by the motor 11 in an usual way (not represented in FIG. 1).

Simultaneously, the motor 11 drives, over a drive shaft 18 outgoing from the crankshaft 14 and a worm gear pair 19, the rotating pump piston 21 of a chain medium pump 20 which simultaneously carries out periodical lifting movements. The pump piston 21 and the driving mechanism are preferably configured as described and represented in the older documents EP-BI-0 560 201 and U.S. Pat. No. 4,465,440 of the applicant. The chain medium pump 20 delivers the chain medium from a store tank or tank 22 over a suction pipe 29 and forces it over a pressure channel 30, a reverse valve 26 and a pressure pipe to the saw chain in the sawing device 12. From the reverse valve 26, a bypass which is constituted by two through bore holes 23, 25 and a ring groove 24 placed on the pump piston 21 returns to the suction pipe 29.

Figure 5:
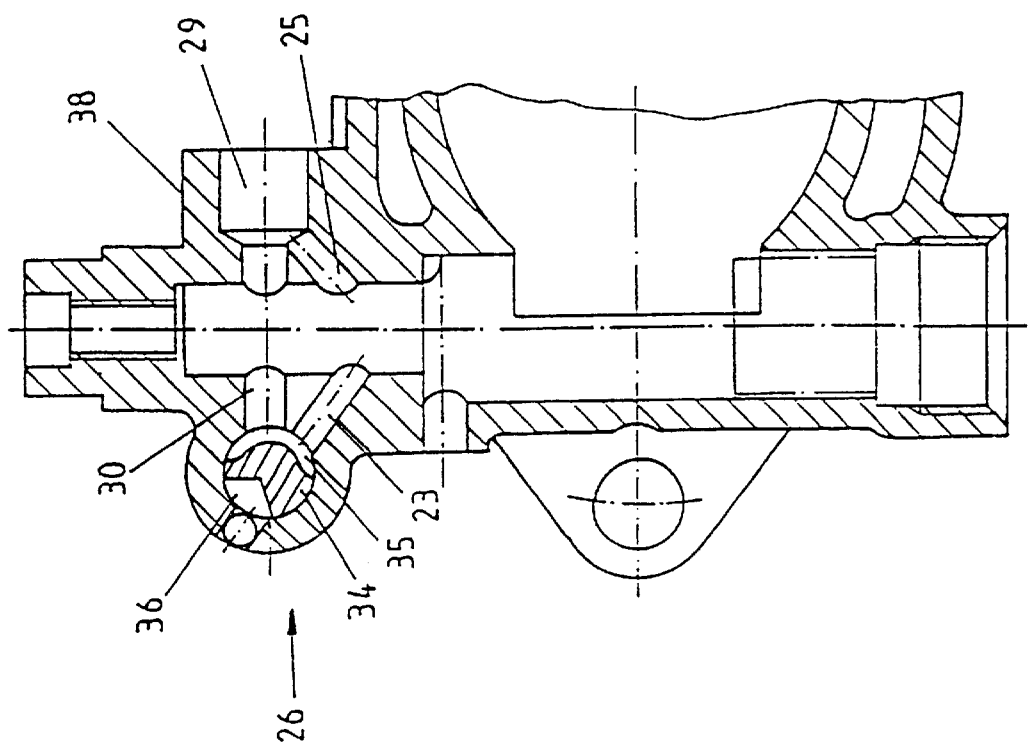
FIG. 5 shows in a representation which can be compared to FIG. 4 a second valve position for which the chain medium is returned into the suction pipe over the bypass.
Figure 4:
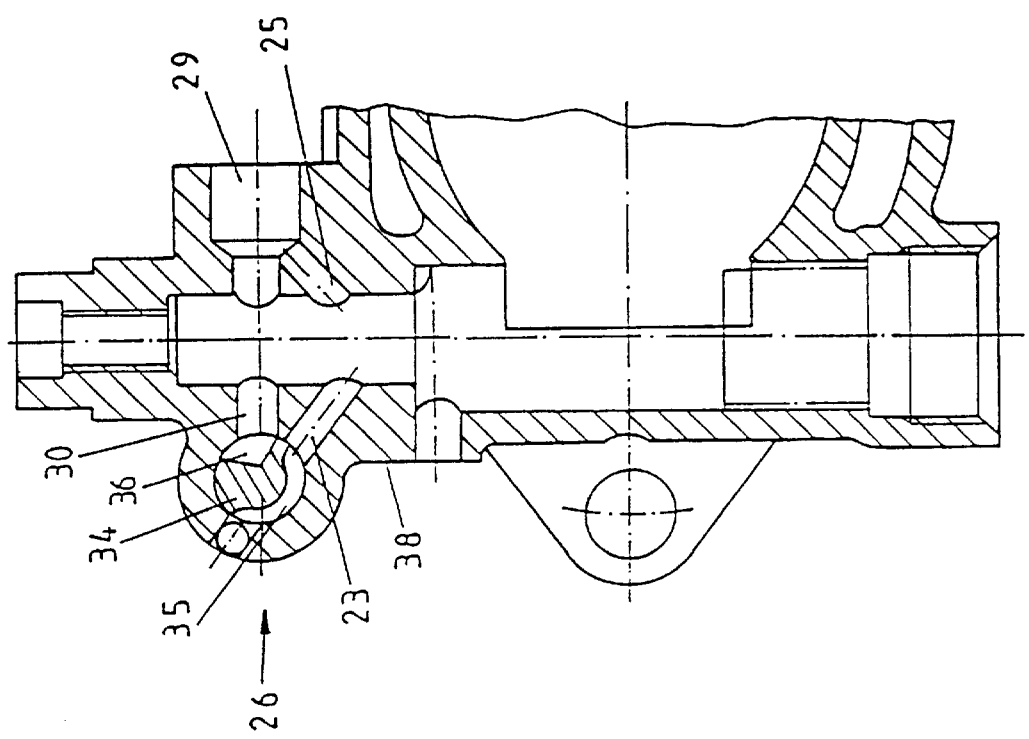
FIG. 4 shows the chain medium pump according to FIG. 3 with the placed valve body according to FIG. 2 in a first valve position for which the chain medium is pumped to the chain (normal operation).

The reverse valve 26 can take two valve positions (cf. about this also FIG. 4 and 5). In the one valve position, the pressure channel 30 and the pressure pipe 27 are connected with each other (FIG. 4). In this case, the chain medium pump 20 transports the chain medium to the saw chain in a traditional way. In the other valve position, the pressure pipe 27 is separated from the pressure channel 30, while the pressure channel 30 is connected with the through bore 23. In this case, the chain medium pump 20 pumps the chain medium and lets it circulate in a circuit closed by the bypass without the chain medium arriving into the pressure pipe 27. The reverse valve 26 is preferably actuated by means of the safety key of the motor saw (15 in FIG. 1 of EP-BI-0 560 201) over a Bowden cable.

The integration of the reverse valve 26 and of the bypass into the chain medium pump which is possible with the invention and particularly simple and compact and which uses already existing pump elements can be explained with reference to the FIGS. 2 and 3. The chain medium pump 20 has, according to FIG. 3, a pump case 38 as it is comparably shown also in EP-BI-0 560 201 and U.S. Pat. No. 4,465,440. The pump piston itself is not represented in FIG. 3, for more clarity, but has substantially the same structure as described in the two above mentioned documents. The worm gear pair 19 is also not explicitly represented. In the upper area, the pump case 38 has a cylinder bore 37 in which the pump piston carries out its lifting and rotating movements. The cylinder bore 37 can be connected on the one side to the suction pipe 29 by a transversally running connecting bore. On the opposite side, the pressure bore 30 starts transversally from the cylinder bore 37. The pressure bore hole 30 ends in a valve bore hole 39 placed in the pump case 38 perpendicularly to the pressure bore 30 and to the cylinder bore 37.

A first through bore 23 leads from the valve bore 39 obliquely back into the cylinder bore 37. This through bore 23 corresponds to the bore 14 in the figure of U.S. Pat. No. 4,465,440. On the opposite side, a second through bore 25 comes from the connection of the pressure pipe 29 also obliquely into the cylinder bore 37, through bore hole which runs into the cylinder bore 37 at approximately the same level as the first through bore 37. Both through bore holes 23, 25 are connected with each other in the cylinder bore hole 37 over the peripheral groove of the placed pump piston.

Figure 2:
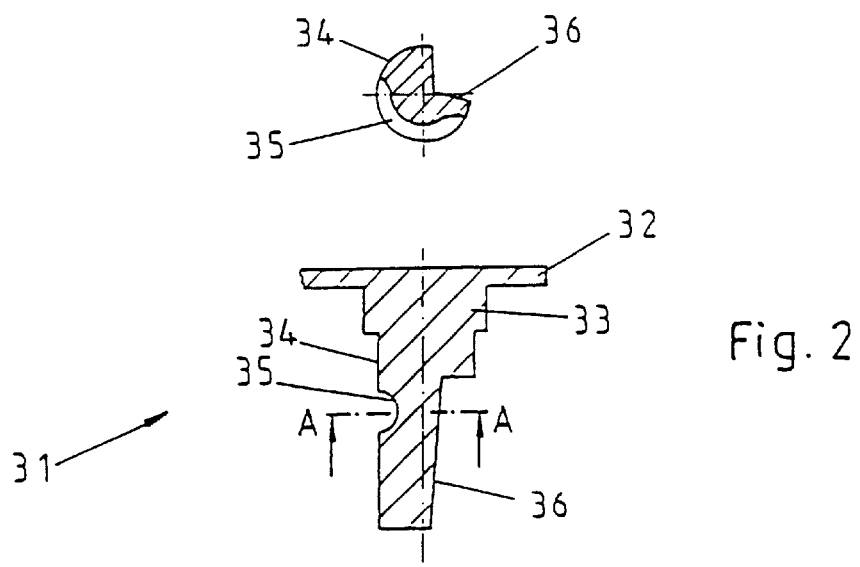
FIG. 2 shows in a longitudinal section (lower half of the figure) and in the cross-section A—A (upper half of the figure) a valve body for a reverse valve according to a preferred embodiment of the invention.

For constituting the reverse valve 26, a valve body 31 according to FIG. 2 is placed into the valve bore 39. The valve body 31 comprises a substantially cylindrical swivelling piston 34 with which it is swivellably stuck in the valve bore 39, as well as a head 33 with a moulded actuating disk 32 into which the Bowden cable engages and which assures the necessary lever arm with its increased diameter. A recess in form of a segment of a circle 36 is provided on the swivelling piston 34 on the one side and extends in the direction of the axle, this recess reaching from short below the head 33 to the end of the valve piston 34. On the other side, a connecting groove 35 circulating over an angle of approximately 160° is placed on the periphery of the valve piston 34.

Figure 3:
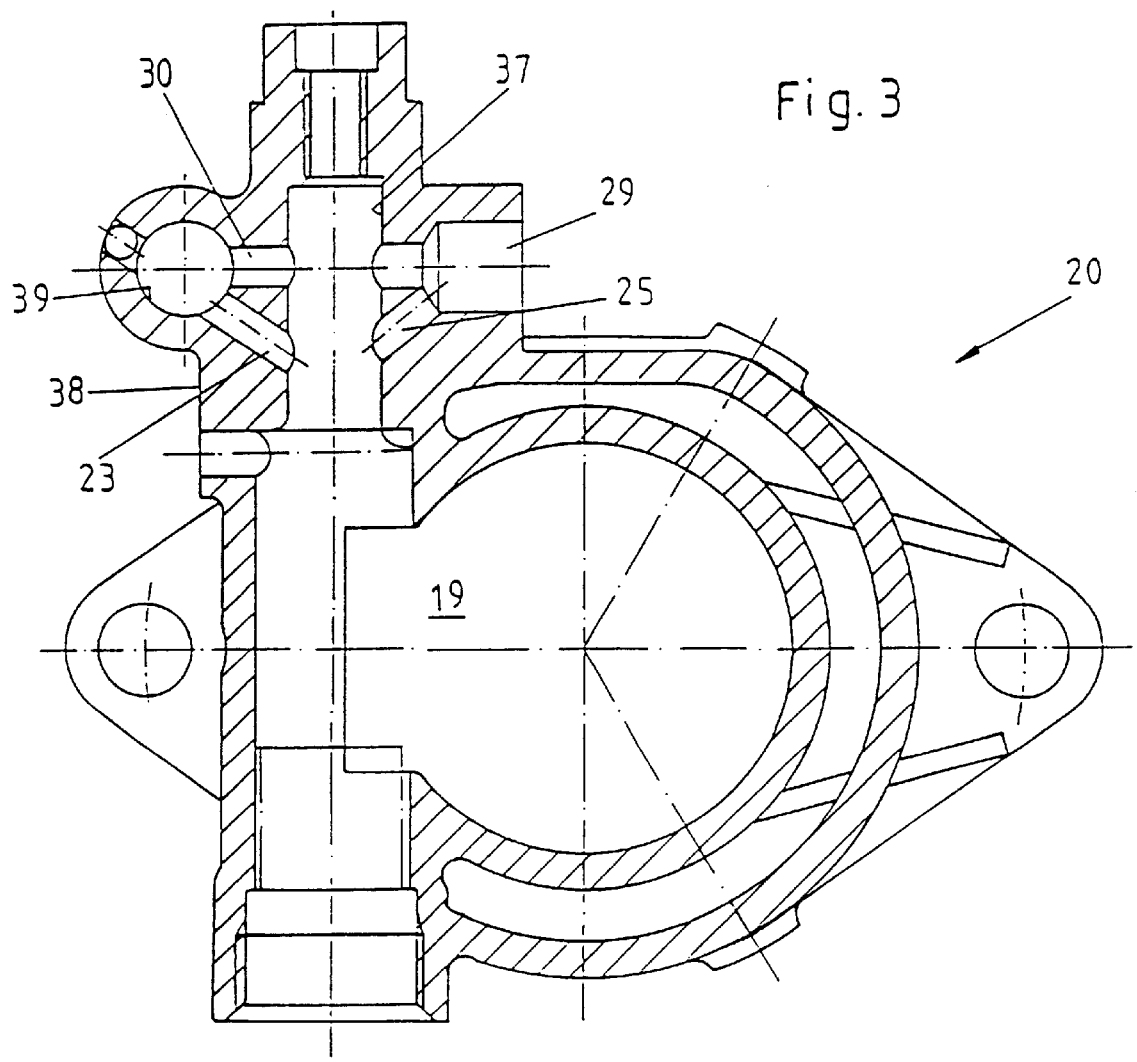
FIG. 3 shows in a sectional representation an example for a pump case for an arrangement according to FIG. 1 for the use of a valve body according to FIG. 2.

If the valve body 31 of FIG. 2 is set into the valve bore 39 in the pump case 38 according to FIG. 3, there result two valve positions represented in FIG. 4 and 5. In the valve position according to FIG. 4, the pressure channel 30 is connected with the pressure pipe 27 outgoing downwards from the valve bore 39 over the recess 36 in the valve body 34. In this position, the chain medium pump pumps the chain medium to the sawing device 12. In the valve position of FIG. 5, the pressure channel 30 and the through bore 23 are connected with each other over the connecting groove in the valve body 34. On the other side, there is no connection with the pressure channel 27 because the connecting groove 35 runs only transversaly to the valve axle. In this position, the chain medium delivered by the pump is led from the pressure channel 30 over the through bore 23, the ring groove on the pump piston and the through bore 25 back into the suction pipe 29.

For obtaining a delivery stop of the chain medium pump at no-load, a 3/2 way reverse valve is used which is integrated in the delivery side of the pump. In the unactuated state (safety key not actuated), the delivery flow is led back to the suction pipe 29 over a bypass, i.e. circularly. The particularity of the bypass is the situation in the pump piston axle. For the manufacturing technics, (compared with the pump of U.S. Pat. No. 4,465,440) only an additional bore (through bore 25) of for example 1,5 mm is necessary on the suction side of the pump. Nothing has to be changed on the pump body (pump case 38) with respect to the casting technique. For receiving the valve body 31, the outlet bore only needs to be bored and reamed onto a valve bore 39 of, for example, 6 mm. An additional sealing is not necessary. The pump piston from U.S. Pat. No. 4,465,440 has a ring groove of 0,8 ×0,3 mm for collecting leaking oil. This ring groove is used as a part of the bypass pipe and must be increased to this purpose to 1,2×0,5 mm in order to assure the connection between the bore holes 23, 24 over the whole lifting path of the pump piston.

The reverse valve 26 or the valve body 31 is designed as a plastic injection moulded part and can be designed with a snap connection so that a retention pin can be recessed for the axial locking. The Bowden cable guide in form of a quarter of a circle is also moulded to the basic body. An angle of 60° to 90° is necessary as a control path so that the system is not susceptible to a lengthening of the Bowden cable. The restoring forces are appropriately produced by a torsion spring seating below the Bowden cable guide. The thrust bearing of the Bowden cable is practically integrated into the motor casing so that there do not result any additional costs.

On the whole, with the invention we obtain a motor chain saw with an automatically disconnecting chain medium pump which is constructed simply, the function of which is safe, which is compact and easy to handle. The automatic disconnection can be realized with less expenditure starting from existing pump models.

LIST OF REFERENCE NUMERALS

10 Motor chain saw
11 Motor
12 Sawing device
13 Crankcase
14 Crankshaft
15 Suction pipe
16 Piston
17 Outlet
18 Drive shaft
19 Worm gear pair
20 Chain medium pump
21 Pump piston
22 Tank (chain medium)
23 Through bore
24 Ring groove (pump piston)
25 Through bore
26 Reverse valve
27 Pressure pipe
28 Chain sword
29 Suction pipe
30 Pressure channel
31 Valve body
32 Actuating disk
33 Head
34 Swivelling piston
35 Connecting groove
36 Recess (in form of a segment of a circle)
37 Cylinder bore
38 Pump case
39 Valve bore

What is claimed is:

1. A motor chain saw comprising a sawing device, a tank for containing a chain medium, a chain medium pump, a suction pipe for drawing chain medium from the tank, and a pressure pipe for delivering chain medium to the sawing device, said chain medium pump having a running state and including an output channel to which chain medium pumped thereby is delivered, a controllable means by means which, when the pump is in its running state, the pump can be switched from a condition at which the pump sucks the chain medium from the tank and delivers substantially all of the chain medium pumped to the output channel through the pressure pipe to the sawing device and a condition at which flow of chain medium through the pressure pipe is interrupted and substantially all of the chain medium pumped by the pump to the pressure pipe after the interruption is returned to the suction pipe.

2. A motor chain saw according to claim 1, wherein the controllable means comprise a reverse valve placed in the pressure pipe and a bypass path leading from the reverse valve to the suction pipe.

3. A motor chain saw according to claim 2, wherein the chain medium pump is placed in a pump case, and the reverse valve and the bypass path are integrated into the pump case.

4. A motor chain saw according to claim 3, wherein the reverse valve is configured as a swiveling piston valve.

5. A motor chain saw according to claim 4, wherein the chain medium pump comprises a pump piston movable in a cylinder bore in the pump case and having a ring groove, the pump case includes a valve bore connected with the cylinder bore over the pressure channel, a substantially cylindrical valve body with a swiveling piston is swiveably positioned in the valve bore, the bypass path is formed by two through bores in the pump case, one of which through bores extends between the valve bore and the ring groove and the other which through bores extends between the ring groove and the suction pipe.

6. A motor chain saw with a chain medium pump according to claim 5, wherein the swiveling piston is pivotably moveable between first and second angular positions in the valve bore, the swiveling piston has a recess in the form of an axially extending segment of a circle which connects, in a first angular position of the piston, the pressure channel with the pressure pipe, and the swiveling piston has a an angularly extending connecting groove which connects, in a second angular position of the piston, the pressure channel with the first through bore.

7. A motor chain saw with a chain medium pump according to claim 6, wherein the angle traverse by the swiveling piston in moving between the first and second angular positions is between 60° and 90°.

8. A motor chain saw with a chain medium pump according to claim 5, wherein the valve body is constructed as a plastic injection molded part.

9. A motor chain saw with a chain medium pump according to claim 5, wherein the valve body is constructed with a snap connection with which it is axially locker in the valve bore.

10. A motor chain saw with a chain medium pump (20) according to claim 1, wherein the motor chain saw (10) comprises a motor having a running state, safety key means for switching the sawing device between activated and deactivated conditions while the motor is in its running state, and means connecting said safety key means with said controllable means so that when the safety key means switches the sawing device to its deactivated condition the flow of chain medium through the pressure pipe (27) is automatically interrupted and when the safety key means switches the sawing device to its activated condition the interruption of flow of chain medium through the pressure pipe (27) is automatically suppressed.

11. A motor chain saw according to claim 10, wherein the means connecting the safety key means with the controllable means comprises a Bowden cable.

* * * * *

UNITED STATES PATENT AND TRADEMARK OFFICE
CERTIFICATE OF CORRECTION

PATENT NO.   : 6,490,795 B1
DATED        : December 10, 2002
INVENTOR(S)  : Klemens Krahn It is certified that error appears in the above-identified patent and that said Letters Patent is hereby corrected as shown below:

<u>Title page,</u>
Item [57], ABSTRACT should read as follows:
-- A motor chain saw having a chain medium pump, the chain medium pump sucking the chain medium over a suction pipe from a tank and delivering it over a pressure pipe to a sawing device of the motor chain saw. For disconnecting the supply of the sawing device with the chain medium, there exist controllable means, with which the pressure pipe is interrupted, the chain medium pump being running, and simultaneously the chain medium delivered by the chain medium pump can be returned into the suction pipe. --.

<u>Column 7,</u>
Line 15, after "it is axially", please delete "locker" insert -- locked --.
Line 17, after "medium pump", please delete -- (20) --.
Line 18, after "chain saw", please delete -- (10) --.

<u>Column 8,</u>
Line 7, after "pressure pipe", please delete -- (27) --.
Line 12, after "pipe", please delete -- (27) --.

Signed and Sealed this

Fifteenth Day of April, 2003

JAMES E. ROGAN
*Director of the United States Patent and Trademark Office*